United States Patent
Linney et al.

(10) Patent No.: US 10,536,581 B2
(45) Date of Patent: Jan. 14, 2020

(54) DYNAMIC LINE MANAGEMENT ENGINE RESIDING IN THE ACCESS NETWORK

(71) Applicant: British Telecommunications Public Limited Company, London (GB)

(72) Inventors: Trevor Linney, London (GB); Ian Horsley, London (GB)

(73) Assignee: British Telecommunications Public Limited Company, London (GB)

( * ) Notice: Subject to any disclaimer, the term of this patent is extended or adjusted under 35 U.S.C. 154(b) by 105 days.

(21) Appl. No.: 15/312,264

(22) PCT Filed: Apr. 30, 2015

(86) PCT No.: PCT/GB2015/051257
§ 371 (c)(1),
(2) Date: Nov. 18, 2016

(87) PCT Pub. No.: WO2015/181520
PCT Pub. Date: Dec. 3, 2015

(65) Prior Publication Data
US 2017/0085719 A1    Mar. 23, 2017

(30) Foreign Application Priority Data
May 30, 2014   (EP) .................................... 14250078

(51) Int. Cl.
*H04M 11/06* (2006.01)
*H04B 3/02* (2006.01)
(Continued)

(52) U.S. Cl.
CPC ............ *H04M 11/062* (2013.01); *H04B 3/02* (2013.01); *H04L 12/2878* (2013.01);
(Continued)

(58) Field of Classification Search
CPC ...... H04M 11/062; H04L 67/28; H04L 67/14; H04L 41/0816; H04L 12/2878; H04L 12/6418; H04B 3/02
See application file for complete search history.

(56) References Cited

U.S. PATENT DOCUMENTS 5,210,518 A   5/1993   Graham et al.
6,650,697 B1  11/2003  Tate et al.
(Continued)

FOREIGN PATENT DOCUMENTS

CN   101217590 A   7/2008
CN   101926125 A   12/2010
(Continued)

OTHER PUBLICATIONS

ITU-T "Series G: Transmission Systems and Media, Disgital Systems and Networks" G.993.2 Amendment 3 (2011) (Year: 2011).*
(Continued)

*Primary Examiner* — Walli Z Butt
(74) *Attorney, Agent, or Firm* — Patterson Thuente Pedersen, P.A.

(57) ABSTRACT

The disclosure includes a method of controlling an Access Network including a plurality of Digital Subscriber Line, DSL, connections, and an Access Network node for performing the method, wherein the method includes: receiving data relating to an event on a DSL connection, the data indicating a factor contributing to the event; and a Dynamic Line Management, DLM, engine, residing in the Access Network, responding to the event, wherein the DLM engine response is dependent on the factor contributing to the event.

19 Claims, 5 Drawing Sheets

(51) Int. Cl.
    *H04L 12/28*     (2006.01)
    *H04L 12/64*     (2006.01)
    *H04L 12/24*     (2006.01)
    *H04L 29/08*     (2006.01)
(52) U.S. Cl.
    CPC ...... *H04L 12/6418* (2013.01); *H04L 41/0816* (2013.01); *H04L 67/14* (2013.01); *H04L 67/28* (2013.01)

(56) References Cited

U.S. PATENT DOCUMENTS

| | | | |
|---|---|---|---|
| 7,035,400 | B1 | 4/2006 | Gaikwad et al. |
| 8,144,580 | B2 | 3/2012 | Pickering et al. |
| 8,406,135 | B2 | 3/2013 | Pickering et al. |
| 8,442,149 | B2 | 5/2013 | Humphrey et al. |
| 8,588,285 | B2 | 11/2013 | Humphrey et al. |
| 8,819,221 | B2 | 8/2014 | Croot et al. |
| 9,246,546 | B2 | 1/2016 | Croot |
| 10,091,022 | B2 | 10/2018 | Horsley et al. |
| 10,193,594 | B2 | 1/2019 | Al Rawi et al. |
| 2001/0021185 | A1 | 9/2001 | Heusala |
| 2003/0099286 | A1 | 5/2003 | Graziano et al. |
| 2004/0014444 | A1 | 1/2004 | Ben Rached et al. |
| 2004/0240575 | A1 | 2/2004 | Rainbolt |
| 2007/0274404 | A1 | 11/2007 | Papandriopoulos et al. |
| 2008/0130640 | A1 | 6/2008 | Hurwitz et al. |
| 2008/0292313 | A1 | 11/2008 | Mahony et al. |
| 2009/0028170 | A1 | 1/2009 | Jiang et al. |
| 2009/0322556 | A1 | 12/2009 | Cook et al. |
| 2010/0290362 | A1 | 11/2010 | Croot et al. |
| 2011/0116621 | A1* | 5/2011 | Bukimer ............ H04M 3/2245 379/413 |
| 2011/0274009 | A1 | 11/2011 | Cooper |
| 2012/0063531 | A1 | 3/2012 | Ginis et al. |
| 2012/0099424 | A1* | 4/2012 | Croot ................. H04L 12/2878 370/225 |
| 2013/0114625 | A1* | 5/2013 | Cunningham ...... H04L 41/5009 370/469 |
| 2014/0029406 | A1* | 1/2014 | Liang ........................ H04J 3/10 370/201 |
| 2014/0098705 | A1 | 4/2014 | Chow et al. |
| 2016/0105215 | A1 | 4/2016 | Wang et al. |
| 2017/0085719 | A1 | 3/2017 | Linney et al. |
| 2017/0244446 | A1 | 8/2017 | Al Rawi et al. |
| 2017/0279634 | A1 | 9/2017 | Horsley et al. |
| 2018/0254798 | A1 | 9/2018 | Horsley et al. |

FOREIGN PATENT DOCUMENTS

| | | |
|---|---|---|
| EP | 1359696 A2 | 11/2003 |
| EP | 2 168 307 B1 | 8/2011 |
| EP | 2 654 690 A1 | 10/2013 |
| EP | 2 830 302 A1 | 1/2015 |
| EP | 2 852 067 A1 | 3/2015 |
| GB | 1316053.6 | 3/2015 |
| GB | 1316054.4 | 4/2015 |
| GB | 2542045 A | 3/2017 |
| WO | WO 2000/035133 A1 | 6/2000 |
| WO | WO 2007/049016 A1 | 5/2007 |
| WO | WO 2012/015817 A2 | 2/2012 |
| WO | WO 2015/055975 A1 | 4/2015 |
| WO | WO 2018/087104 A1 | 5/2018 |
| WO | WO 2018/087106 A1 | 5/2018 |

OTHER PUBLICATIONS

International Search Report for corresponding International Application No. PCT/GB2015/051257 dated Jul. 20, 2015; 4 pages.
Written Opinion for corresponding International Application No. PCT/GB2015/051257 dated Jul. 20, 2015; 5 pages.
International Preliminary Report on Patentability for corresponding International Application No. PCT/GB2015/051257 dated Aug. 5, 2016; 6 pages.
Extended European Search Report for corresponding EP Application No. 14250078.4 dated Nov. 12, 2014; 6 pages.
International Telecommunication Union, "Telecommunication Standardization Sector of an ITU, Series G: Transmission Systems and Media, Digital Systems and Networks. Digital sections and digital line system—Access networks. Very high speed digital subscriber line transceivers 2 (VDSL2), Recommendation ITU-T G.993.2, Amendment 3," (Apr. 2013); 24 pages.
International Telecommunication Union, "Telecommunication Standardization Sector of an ITU, Series G: Transmission Systems and Media, Digital Systems and Networks. Digital sections and digital line system—Access networks. Physical layer management for digital subscriber line transceivers, Recommendation ITU-T G.997.1, Amendment 2," (Apr. 2013); 10 pages.
Maes et al., "Maximizing digital subscriber line performance," Bell Labs Technical Journal (2008) 13 (1): p. 105-116. XP-002591690.
European Search Report, Application No. EP 05256607.2, dated Mar. 29, 2006, 7 pages.
Written Opinion of the International Searching Authority for corresponding International Application No. PCT/GB/2006/003934dated Apr. 29, 2008; 5 pages.
Application No. EP06794870.3, dated Apr. 15, 2011, Communication about intention to grant a European Patent, 24 pages.
Application No. EP06794870.3, dated Mar. 22, 2011, Result of Consultation, 3 pages.
Application No. EP06794870.3, dated Oct. 5, 2010, Annex to the Communication/Summons to attend oral proceedings, 5 pages.
Application No. EP06794870.3, dated Mar. 27, 2009, Communication from the Examining Division/Annex to the Communication, 5 pages.
International Preliminary Report on Patentability for corresponding International Application No. PCT/GB2006/003934 dated Apr. 29, 2008; 6 pages.
International Search Report for PCT/GB2006/003934 dated Jan. 9, 2007.
Crabtree et al., "Equitable quality video Streaming", BT Group Chief Technology Office, Apr. XX, 2008, 6 pages.
Murcic et al, "Influence of data frame duration on performance of BITCM system over HV power line", University of Tuzla, 4 pages.
Sedarat, "VDSL2: Multi-Rate Impulse Protection", Jan. 17-21, 2005, 4 pages.
Norrell et al., "VDSL2: Proposal for Impulse Noise Mitigation Scheme for VDSL2" Oct. 18-22, 2004, 2 pages.
Application No. 12/067,486, filed Mar. 20, 2008. Inventors: Humphrey et al.
Application and Filing Receipt for U.S. Appl. No. 15/504,795, filed Feb. 17, 2017, Inventors: Horsley et al.
Application and Filing Receipt for U.S. Appl. No. 15/515,403, filed Mar. 29, 2017, Inventors: Al Rawi et al.
ITU Telecommunication Standardization Section Technical Document SI-045 "VDSL2: Proposal for Impulse Noise Mitigation Scheme for VDSL2" at the Oct. 2004 ITU-T SG 15/Q4 meeting in Stresa, Italy; 2 pages.
Application and Filing Receipt for U.S. Appl. No. 11/989,136, filed Jan. 22, 2008, Inventor(s): Pickering et al.
Application and Filing Receipt for U.S. Appl. No. 11/989,408, filed Jan. 25, 2008, Inventor(s): Pickering et al.
Application and Filing Receipt for U.S. Appl. No. 13/121,095, filed Jun. 20, 2011, Inventor(s): Nishikawa et al.
Application and Filing Receipt for U.S. Appl. No. 13/144,904, filed Jul. 15, 2011, Inventor(s): Ian Robert Cooper.
Application and Filing Receipt for U.S. Appl. No. 14/347,558, filed Mar. 26, 2014, Inventor(s): Christopher Marcus Croot.
Application as filed for U.S. Appl. No. 16/348,043, filed May 7, 2019, Inventor(s): Horsley et al.
Application as filed for U.S. Appl. No. 16/348,053, filed May 7, 2019, Inventor(s): Horsley et al.
Application as filed for U.S. Appl. No. 15/759,340, filed Mar. 13, 2018, Inventor(s): Horsley et al.
Chinese Search Report for Application No. 201580028067.9, Application Date Apr. 30, 2015, dated Oct. 26, 2018 (4 pgs, including English Translation).

(56) References Cited

OTHER PUBLICATIONS

ETSI TS 101 270-1 V1.2.1 Technical Specification Transmission on Multiplexing (TM); Access transmission systems on metallic access cables; Very high speed Digital Subscriber Line (VDSL); Part 1: Functional requirements; European Telecommunications Standards Institute Oct. 1999; Valbonne—France; 60 pages.

International Search Report and Written Opinion for Application No. PCT/EP2016/072012, filed Sep. 16, 2016, dated Dec. 19, 2016 (9 pgs).

International Search Report and Written Opinion for Application No. PCT/EP2017/078509, filed Nov. 7, 2017, dated Feb. 2, 2018 (11 pgs).

International Search Report and Written Opinion for Application No. PCT/EP2017/078512, filed Nov. 7, 2017, dated Feb. 26, 2018 (10 pgs).

ITU-T Telecommunication Standardization Sector of ITU G.994.1 as extended by G.9701; Apr. 2017; Series G: Transmission Systems and Media, Digital Systems and Networks; Digital sections and digital line system—Metallic access Networks Handshake procedures for digital subscriber line transceivers; 910 pages.

Strobel; Coexistence of G.Fast and VDSL in FTTDP and FTTC Deployments; Rainer Strobel & Wolfgang Utschick; 23$^{rd}$ European Signal Processing Conference (EUSIPCO) Munchen, Germany; 5 pages.

* cited by examiner

DYNAMIC LINE MANAGEMENT ENGINE RESIDING IN THE ACCESS NETWORK

CROSS-REFERENCE TO RELATED APPLICATIONS

The present application is a National Phase entry of PCT Application No. PCT/GB2015/051257, filed on 30 Apr. 2015, which claims priority to EP Patent Application No. 14250078.4, filed on 30 May 2014, which are hereby fully incorporated herein by reference.

TECHNICAL FIELD

The present disclosure relates to data communication. In particular, this disclosure relates to controlling Digital Subscriber Line (DSL) connections.

BACKGROUND

Digital Subscriber Lines (DSL) are a common technology for providing digital communication over existing twisted copper pair subscriber lines. The subscriber line extends between two DSL modems. A first DSL modem is typically located in the customer's premises, and the second modem may be located at the local exchange (known as the 'central office' in US terminology), a street cabinet, or distribution point (sometimes known as 'drop point'). Typically, the local exchange, street cabinet or distribution point includes a DSL Access Multiplexer (DSLAM), a form of aggregation transceiver device, comprising several DSL modems (one for each subscriber line). The DSLAM (at the exchange, cabinet or distribution point) connects the first DSL modem at the customer's premises to the Core Network.

There are various Network Management Systems within the Core Network to manage and control the various subscriber lines. One form of Network Management System is a Dynamic Line Management (DLM) engine for controlling DSL connections. In current DSL deployments, the DLM engine in the Core Network receives data periodically from a DSLAM relating to all DSL connections to that DSLAM. This data is usually sent at intervals (e.g. once a day) as a bulk data file and includes, for example, the number of retrains or number of errors per 15 minute bin since the last data upload. The DLM engine receives this data from all its connected DSLAMs, and analyzes the data to determine if any actions need to be taken. For example, if one subscriber line has retrained many times, a line profile with a more conservative rate cap may be applied.

The present inventors have identified an issue with the current DLM technique. That is, the DLM engine requires a bulk data file to be uploaded (typically to the Operations Support System, OSS) and processed periodically. As more DSL connections are established in the network, and/or more data points for each line are added, the bulk data file becomes too large to upload and process in a small time frame. This makes the DLM engine slow to react to any issues on the network.

Furthermore, trying to process bulk data for an ever increasing number of lines and/or data points is leading to overload of the systems in the OSS stack. Also, the integrity of the data collection process varies day-to-day as many lines may have incomplete aggregated data due to failures in data collection and processing.

International Patent Application Publication No. 2012/015817 discloses a DLM engine which responds to a disruption on the line (e.g. an increase in errors) by determining and applying an appropriate control setting at the PHY layer which will achieve a known desired effect on a higher-layer application.

It is therefore desirable to alleviate some or all of the above problems.

SUMMARY

According to a first aspect of the disclosure, there is provided a method as claimed in claim 1.

The present disclosure provides an improved DLM architecture which allows the DLM engine to react to events on a DSL connection by taking into account a factor contributing to the event. By reacting to the factor contributing to the event, the DLM engine may respond in a more appropriate manner and forestall such events occurring in the future.

Furthermore, the DLM engine resides in the Access Network, contrary to the Core Network deployment of the prior art. This allows the DLM engine to receive the data relating to an event (including the factor contributing to the event) and react to it in real-time. The centralized Core Network DLM engine of the prior art relies on data being uploaded in bulk by multiple DSLAMs, which would be too inefficient if modified to contain the factor or factors contributing to the event. Accordingly, a distributed architecture is used, which, whilst a departure from the prior art technique, allows the DLM engine to focus on a smaller number of DSL connections and react to events occurring on them in real-time.

Distributing the DLM engine throughout the Access Network has several other benefits. Firstly, there is no longer a single point of failure as experienced by the Core Network deployment of the prior art. Secondly, distribution of multiple DLM engines means there are fewer lines associated with each DLM engine and new DLM engine algorithms can be tested and implemented in a controlled rollout.

There are further advantages. Currently, when the firmware of a DSLAM is updated (e.g. as a standard is updated), the DLM engine in the Core Network deployment needs to know which DSLAMs have been updated and which have not. This is burdensome for the Network Operator. However, with the distributed DLM architecture of the present disclosure, the DLM engine can be updated in conjunction with the associated DSLAM's firmware update.

After receiving data relating to an event on the DSL connection, the method may further comprise: storing the received data in memory in a proxy management unit; and forwarding the data stored in said memory in the proxy management unit to the DLM engine. Thus, the data may be received and stored in a proxy management unit (also known as a Persistent Management Agent). In G.fast deployments, this allows the data to be stored on a unit with a more reliable power supply, which may be used as a backup or proxy in the event a Distribution Point Unit, DPU (which are reverse powered) loses power. The present disclosure may therefore co-operate with such a proxy management unit in a dedicated node in the Access Network, and react to the data once forwarded to the DLM engine.

After storing the received data in said memory, the method may further comprise: classifying the data stored in said memory as either an event related to the stability of the DSL connection or an event related to the speed of the DSL connection. Furthermore, the data stored in the data buffer may only be forwarded to the DLM engine if it is classified as an event related to the stability of the DSL connection. The DLM engine may therefore only react to the event if it is classified as one related to the stability of the DSL connection. Alternatively, the event may be speed related, and the event may be forwarded to an ANCP relay such that an Access Network Control Protocol, ANCP, message may be sent to a Communications Provider Broadband Remote Access Server, CP BRAS, associated with the DSL connection.

The DLM engine may respond to the event after the event has occurred a predetermined number of times. This response may be after the event has occurred a predetermined number of times in a predetermined time period, and/or may be after the event has occurred a predetermined number of times for the same contributing factor.

The DLM engine may respond to the event using an On Line Reconfiguration, OLR, process.

The method may further comprise, initially, gathering data on the DSL connection, wherein the data is gathered using the data gathering function defined in ITU-T Recommendation G.993.2 (2011) Amendment 3.

The DSL connection may be a VDSL, VDSL2 or G.fast connection. The DLM engine may reside in a dedicated node in the Access Network or collocated with the DSLAM (e.g. in the street cabinet).

According to a second aspect of the disclosure, there is provided an Access Network node as claimed in claim 12.

The node may further comprise a proxy management unit including a receiver adapted to receive the data relating to the event; memory adapted to store the received data; and a transmitter adapted to transmit the data relating to the event to the DLM engine.

The node may further comprise a processor adapted to classify the data stored in said memory, wherein the data stored in said memory is only forwarded to the DLM engine by the transmitter if it is classified as an event related to the stability of the DSL connection.

The node may further comprise a processor adapted to classify the data stored in said memory, wherein the data stored in said memory is classified as either an event related to the stability of the DSL connection or an event related to the speed of the DSL connection.

The node may further comprise a counter adapted to count events on the DSL connection, wherein the DLM engine may be adapted to respond to the event when the counter reaches a predetermined threshold. The counter may be adapted to count events on the DSL connection having the same contributing factor, and/or the DSL engine may be adapted to respond to the event when the counter reaches a predetermined threshold in a predetermined time period.

The DLM engine may respond to the event using an On Line Reconfiguration, OLR, process.

The DSL connection may be a G.fast connection and the receiver may be adapted to receive data relating to the event on a DSL connection from a Distribution Point Unit, DPU.

The DSL connection may be a VDSL connection and the receiver may be adapted to receive data relating to the event on the DSL connection from a street cabinet. Alternatively, the DSL connection may be a VDSL connection and the node may reside in a street cabinet.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
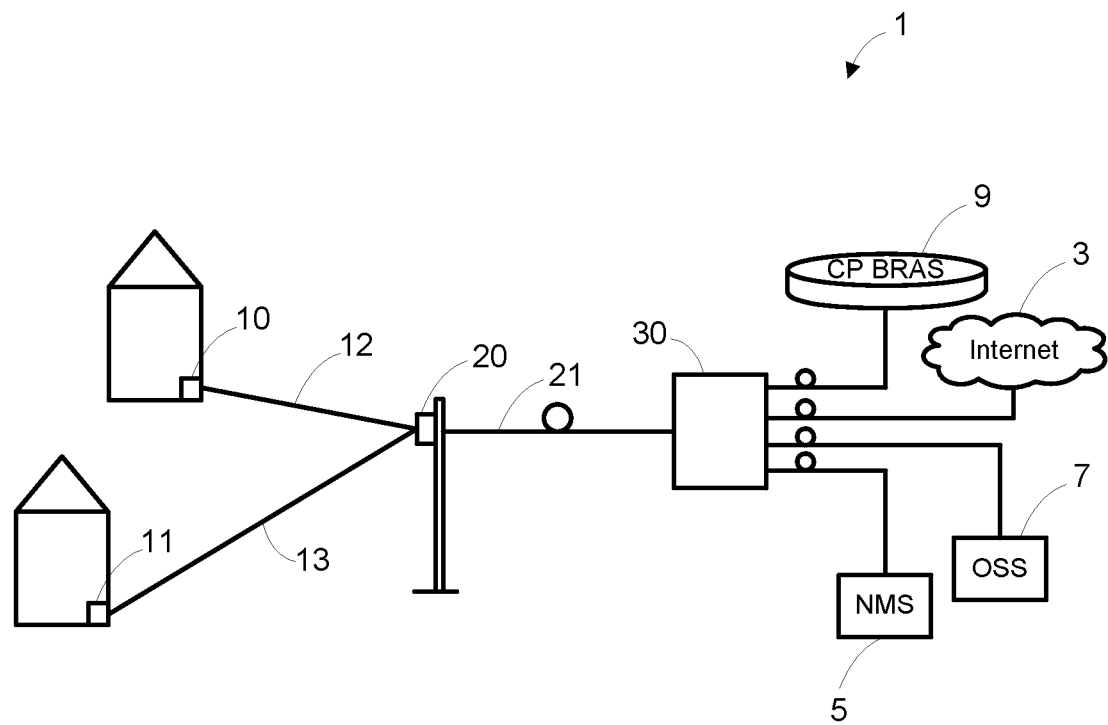
FIG. 1 is a schematic diagram illustrating a first embodiment of the present disclosure, including a first and second Customer Premises Equipment, a Distribution Point Unit, and a head-end node.

A first embodiment of the present disclosure will now be described with reference to FIGS. 1 to 2. FIG. 1 shows a Fiber to the Distribution Point (FTTDP) optical network 1. In this embodiment, the optical network is a Passive Optical Network (PON). A distribution drop point unit 20 (DPU) is provided which is located on a pole proximal to a plurality of subscriber premises. The DPU 20 is connected to a first and second Customer Premises Equipment (CPE) 10, 11 via first and second overhead drop wires 12, 13 respectively. The DPU 20 is further connected to a head-end node 30 via an optical connection. The DPU 20 therefore contains an Optical Line Terminal (OLT) for converting between the electrical signals which may be transmitted over the overhead drop wires 12, 13 and optical signals which may be transmitted to/from the optical head-end unit 30. The DPU 10 also acts as a Digital Subscriber Line Access Multiplexer (DSLAM) to aggregate data for multiple subscriber lines (in this example, for CPEs 10, 11) onto a single high-capacity uplink to the head-end node 30.

In this embodiment of the disclosure, the FTTDP deployment is a form of G.fast connection (however, the skilled person will understand that the DPU may also support a VDSL connection). In other forms, the DPU may be mounted on a pedestal, in a footway box, or an underground chamber connected to the CPE via either overhead or underground wires. The DPU 20 is reverse powered via the overhead drop wires 12, 13, for example by a reverse powering scheme as disclosed in Applicant's European Patent Application No. 13250085.1.

The head-end node 30, which will be described in more detail below, resides in the Access Network and connects the DPU 20 to the Internet 3, Network Management System (NMS) 5, Operation Support System (OSS) 7 and Communications Provider Broadband Remote Access Server (CP BRAS) 9.

Figure 2:
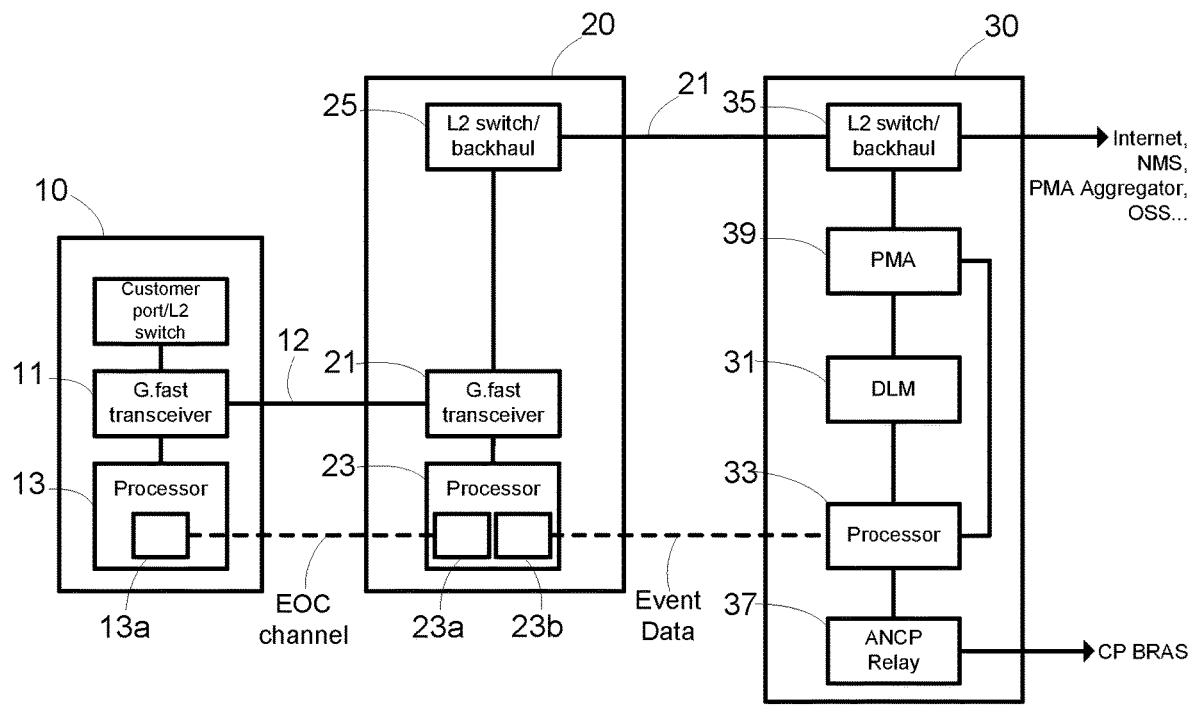
FIG. 2 is a schematic diagram illustrating the elements of the CPE, DPU and head-end node of FIG. 1.

FIG. 2 is a schematic diagram illustrating the various features of the first CPE 10, DPU 20 and head-end node 30 (the skilled person will understand that a similar architecture exists for the second CPE 11). The CPE 10 and DPU 20 both include a G.fast transceiver 11, 21 for sending and receiving signals over drop wire 12 (thus forming a G.fast connection). Both G.fast transceivers 11, 21 cooperate with a processing module 13, 23. Both processing modules 13, 23 include a performance statistics module 13a, 23a configured to monitor the transceivers 11, 21 and record data relating to the connection (e.g. in memory or in a data buffer). The two performance statistics modules 13a, 23a communicate via an EOC channel (the logical connection is shown in dotted lines in FIG. 2), which is physically connected over the G.fast connection.

The CPE 10 also includes a customer port/Layer 2 switch.

The processing modules 13, 23 for the CPE 10 and DPU 20 are both configured to implement control plane functions, which will be discussed in more detail below.

The DPU 20 processing module 23 further includes a data gathering module 23b. In general terms, the data gathering module is configured to monitor the G.fast connection (e.g. using data from the performance statistics module 23a) and record data relating to any event occurring on the connection (e.g. in memory or in a data buffer). As explained in more detail below, the data not only specifies what event occurred (e.g. a retrain), but also specifies what factor contributed to the event (e.g. a retrain due to a loss of margin).

The DPU 20 transceiver 21 and processing module 23 are both connected to a Layer 2 switch/backhaul module 25, which is connected via an optical fiber connection 21 to a corresponding Layer 2 backhaul module 35 in the head-end node 30. The head-end node 30 is therefore configured to receive backhaul data from the DPU 20 via the optical fiber connection 21, and in addition is configured to receive data from the data gathering module 23b. This data is routed to a processing module 33 (the logical connection is shown in dotted lines), which is generally configured to classify the data and instruct an appropriate entity depending on its classification. The head-end node 30 further includes a DLM engine 31, an Access Node Control Protocol (ANCP) Relay 37 and Persistent Management Agent (PMA) 39. The skilled person will understand that moving the DLM engine 31 into the Access Network is a departure from the prior art methods of implementing the DLM engine in the Core Network as part of the Network Management System. The benefits of distributing the DLM engine 31 throughout the Access Network will become clear upon review of the following description.

Figure 3:
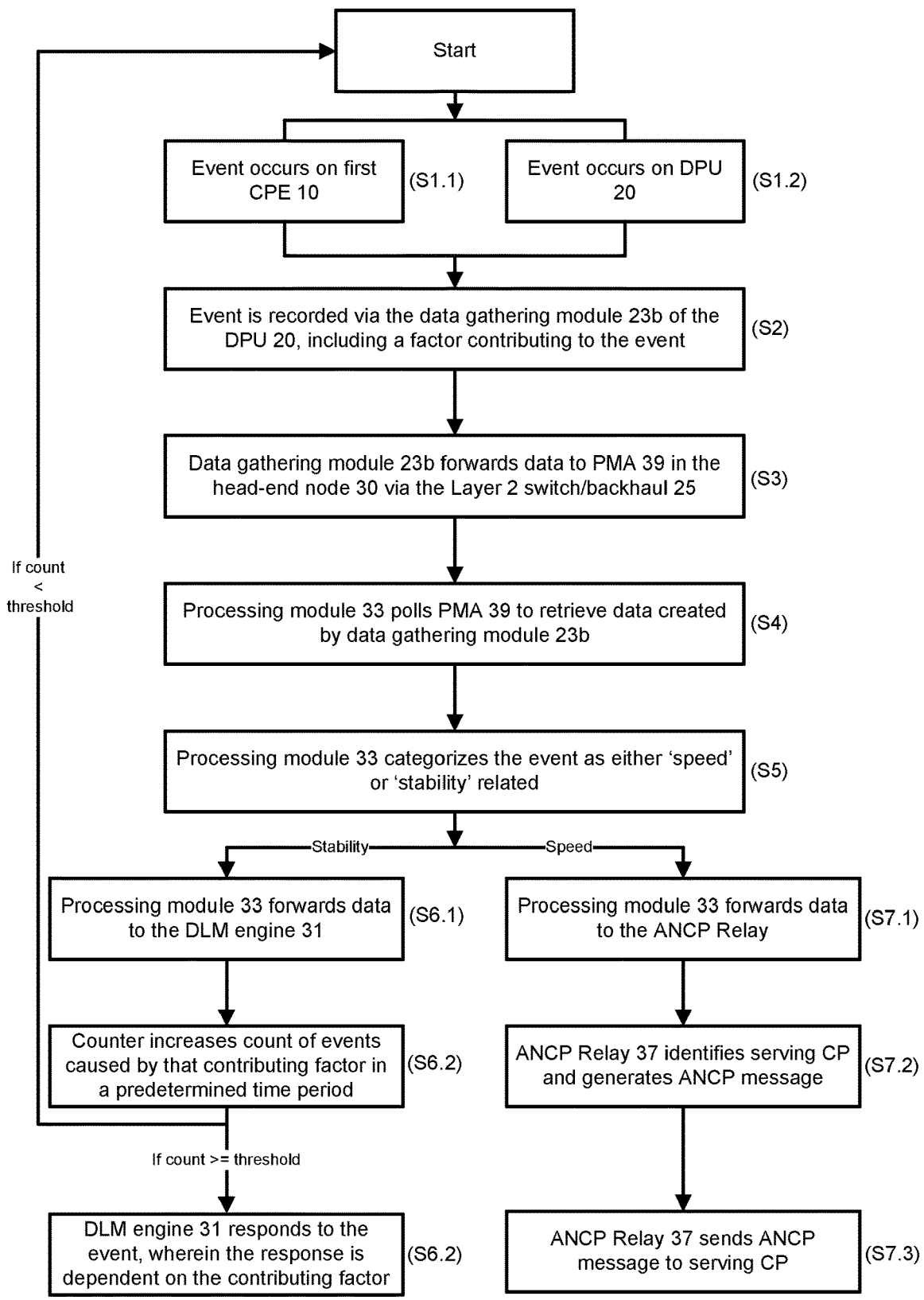
FIG. 3 is a flow diagram illustrating a first embodiment of a method of the present disclosure.

To aid understanding of these features and their interaction, a method of the present disclosure will now be described with reference to FIG. 3.

As a first step, an event occurs on the G.fast connection. In one example, the event occurs at the first CPE 10 (S1.1), such that the performance statistics module 13a of the first CPE 10 signals the occurrence of this event and sends its related data to the DPU 20 performance statistics module 23a via the EOC channel of the G.fast connection. In another example, an event occurs at the DPU 20 (S1.2). In both examples, the event is recorded via the data gathering module 23b of the DPU 20 (S2). The data gathering module 23b records the occurrence of the event and a factor (or factors) contributing to the event. In this embodiment, the data gathering module 23b implements the "Data gathering function" as defined in ITU-T Recommendation G.993.2 Amendment 3, which creates a record for each occurrence of an event, with each record entered in a data buffer with an event timestamp, event identifier, and additional event data defining a factor or factors contributing to the event. The data gathering module 23b forwards this data to the head-end node 30 via the Layer 2 switch/backhaul connection (S3).

The PMA 39 is configured to receive the data from the data gathering function and store it in a data buffer. In this embodiment, and as explained in more detail in Applicant's UK Patent Application No. 1316053.6, the PMA 39 stores metric data relating to the DPU 20. As the head-end node 30 and PMA 49 have a more reliable power supply than the DPU 20 (which is reverse powered), the PMA 39 may act as a back-up or proxy for critical metric data in the event the DPU 20 loses power.

As shown at S4, the processing module 33 is further configured to poll the data buffer of the PMA 39 to retrieve the data created by the data gathering module 23b. In this embodiment, the processing module 33 and PMA 39 therefore include a Q management interface, as described in ITU-T Recommendation G.997.1 Amendment 2, such that the processing module 33 may poll the PMA's 39 data buffer every N seconds using the "EVENT_TRACE_BUFFER_O" and "EVENT_TRACE BUFFER_R" functions (for events occurring at the DPU and CPE respectively). The value of N may be between 1 second (the minimum granularity of reporting) and the maximum buffer length related to "LOGGING_DEPTH_O"/"LOGGING_DEPTH_R" parameters from the above ITU-T Recommendation.

The processing module 33 therefore receives the data created by the data gathering module 23b. Generally, this data relates to events occurring on the G.fast connection between the transceivers 21, 11 at the DPU 20 and CPE 10, and includes at least one factor contributing to each event. Next in this embodiment (S5), the processing module 33 categorizes the event as either 'speed' or 'stability' related. This classification allows the processor 33 to determine which entity should act in response to the event.

At S6.1, the processing module 33 classifies the event as stability related and thus determines that the DLM engine 31 should act in response to the event. In this embodiment, the DLM engine 31 resides in the head-end node 30 and thus in the Access Network, allowing it to act in real-time in response to any events reported by the data gathering module 23b (contrary to the conventional technique, which only allowed periodic updates of bulk data files to a DLM engine in the Core Network). The event data is therefore forwarded to the DLM engine 31.

The DLM engine 31 is configured to act on the G.fast connection in response to the event, wherein the action takes into account the factor or factors contributing to the event. In this embodiment, the DLM engine 31 is configured to act on the G.fast connection via the control plane functionality implemented by the PMA 39 and the processing modules 13, 23 of the DPU 20 and CPE 10.

The skilled person will understand that the DLM engine 31 is highly configurable and each type of event and factor contributing to the occurrence of the event may have one of several appropriate responses. An example of the DLM engine 31 reacting to an 'End of Showtime' event will now be described.

In this example, the DLM engine 31 receives data relating to an 'End of Showtime' event from the processing module 33. The data indicates the event identifier classifying it as 'End of Showtime', a timestamp for the event, and an indication of a factor contributing to the event. In this example, the factor contributing to the event is persistent severely errored seconds (i.e. several consecutive severely errored seconds).

In response, the DLM engine 31 responds to the event by acting on the line. The action taken is in dependence on the factor contributing to the event. Accordingly, in this example, the DLM engine 31 responds to the 'End of Showtime' event caused by persistent severely errored seconds by increasing the level of error correction on the G.fast connection. This action is taken via the PMA 39 and control plane interface to the DPU 20 and CPE 10. For example, the action may utilize the On Line Reconfiguration (OLR) functionality to change configuration without causing a retrain. If a retrain is required, the PMA 39 could wait for the G.fast line to enter a low power state or non-traffic state before executing the change.

Thus, the skilled person will understand that the DLM engine 31 of the present disclosure is able to react to the event in a real-time manner, and the action taken in response to the event is specific to the cause of the event and thus will help forestall such events occurring in the future.

In another example, the DLM engine 31 receives data relating to an 'End of Showtime' event from the processing module 33, but the data indicates that the factor contributing to the event was due to a loss of margin. In response, the DLM engine 31 moves the G.fast connection to a more conservative line profile having a reduced line rate, which is applied to the connection via the PMA 39 and control plane interface to the DPU 20 and CPE 10.

The above two examples illustrate two ways the DLM engine 31 may respond to an 'End of Showtime' event in different manners depending on the factor contributing to the event. However, the skilled person will understand that there are many different types of event which may occur on a G.fast connection which may then be forwarded to the DLM engine 31 for action. In this embodiment, the data gathering module 23b classifies events as per ITU-T Recommendation G993.2 Amendment 3 (Table 11-43), which includes the following events which may be forwarded to the DLM engine 31: End of Showtime, Previous End of Showtime, Failed Initialization, Successful Initialization, Line Failure, CRC-8 Anomalies, OLR, Bitswap, Retransmission Event or Defect. The above ITU-T Recommendation further specifies the factors contributing to the event which may be recorded by the data gathering module 23b, and, by using the method of the present disclosure, may ultimately be acted upon in response by the DLM engine 31.

In the above examples, the DLM engine 31 acts in response to a single event. However, as shown in FIG. 3 and steps S6.2 to 6.3, the DLM engine 31 includes a counter which is configured to count the number of events caused by a particular factor in a predetermined time period, and react to the event (wherein the reaction takes into account the factor contributing to the event) if the number of events caused by a particular factor in a predetermined time period exceeds a threshold.

As noted above, the processing module 33 may instead classify the event as 'speed' related. In this case, and as shown in steps S7.1 to S7.3 of FIG. 3, the processing module 33 forwards the event to the ANCP Relay 37. The function of the ANCP Relay 37 (as described in more detail in Applicant's UK Patent Application No. 1316054.4) is to identify the Communications Provider serving the G.fast connection and route the ANCP notification to the corresponding CP BRAS 9. This allows the DPU 20 to maintain a single connection with the head-end node 30 rather than multiple connections between the DPU 20 and the corresponding BRAS for all Communications Providers serving each subscriber line connected to the DPU 20.

The ANCP Relay 37 is therefore configured to act in response to the event by identifying the Communications Provider serving the G.fast connection, generating an ANCP message, and sending the ANCP message to the identified Communications Provider.

The events that may be classified as a 'speed' event and are therefore forwarded to the ANCP Relay are also covered in ITU-T Recommendation G993.2 Amendment 3 (Table 11-43), and include: Downstream Initialization Net Data Rate, Upstream Initialization Net Data Rate, Downstream Net Data Rate After Successful SRA, Upstream Net Data Rate After Successful SRA, Downstream Net Data Rate After Successful SOS, Upstream Net Data Rate After Successful SOS.

In an example, the processing module 33 may receive a Downstream Initialization Net Data Rate event indicating that the G.fast connection has initialized at a low data rate. The processing module 33 classifies this as a 'speed' event, and forwards the event to the ANCP Relay 37. The ANCP Relay 37 identifies the Communications Provider serving the G.fast connection, and generates and forwards to the Communications Provider an ANCP message indicating the new downstream data rate. This allows the CP BRAS 9 to make the necessary changes in response to the new downstream data rate (e.g. throttle back any traffic for that G.fast connection according to the new rate).

Figure 4:
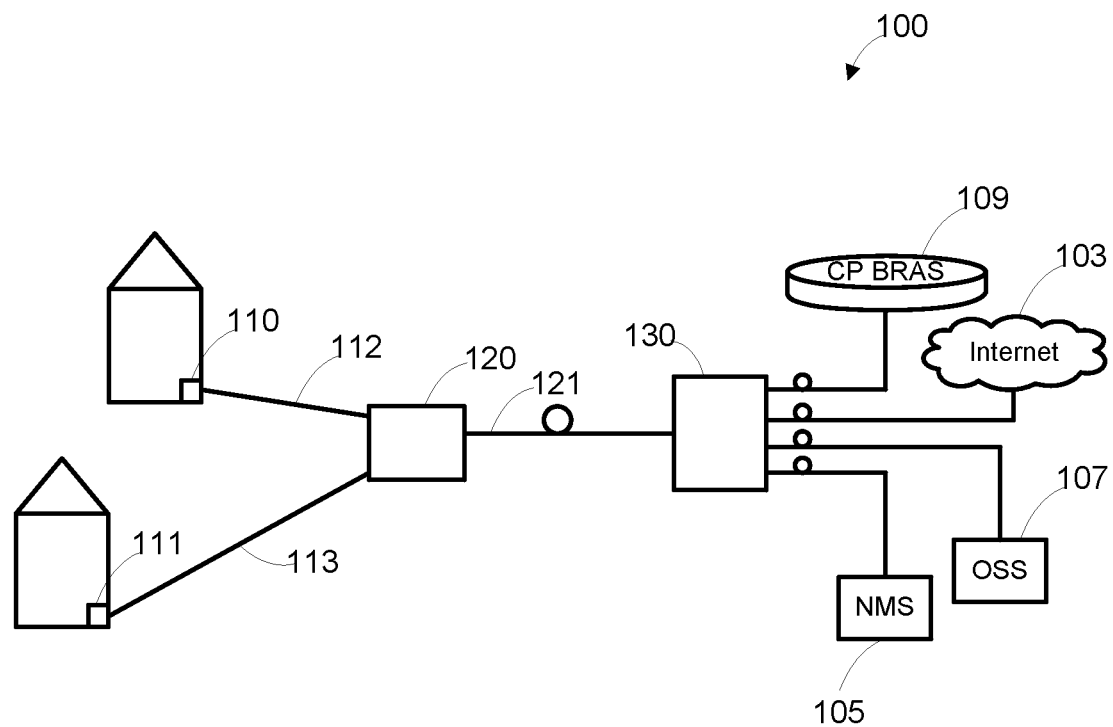
FIG. 4 is a schematic diagram illustrating a second embodiment of the present disclosure, including a first and second Customer Premises Equipment, a street cabinet, and a head-end node.

A second embodiment of the present disclosure will now be described with reference to FIGS. 4 and 5. FIG. 4 illustrates a Fiber To The Cabinet (FTTC) deployment of the second embodiment. A street cabinet 120 is provided, which interconnects a first and second Customer Premises Equipment (CPE) 110, 111 to a head-end node 130. The street cabinet 120 connects to the CPEs 110, 111 via twisted copper pair wires 112, 113 and to the head-end node 130 via an optical fiber connection 121. The street cabinet 120 therefore contains an Optical Line Terminal (OLT) for converting between the electrical signals which may be transmitted over the twisted copper pair wires 112, 113 and optical signals which may be transmitted to/from the optical head-end unit 130 over the optical fiber connection 121. The street cabinet 120 also acts as a Digital Subscriber Line Access Multiplexer (DSLAM) to aggregate data for multiple subscriber lines (in this example, for CPEs 110, 111) onto a single high-capacity uplink to the head-end node 130.

In this embodiment, the DSL deployment is a VDSL connection. However, the skilled person will understand that VDSL may also be deployed at either the distribution drop point or exchange. Furthermore, the skilled person will understand that the street cabinet setup of this embodiment may use other DSL technologies, such as ADSL, ADSL 2, ADSL 2+, etc.

Figure 5:
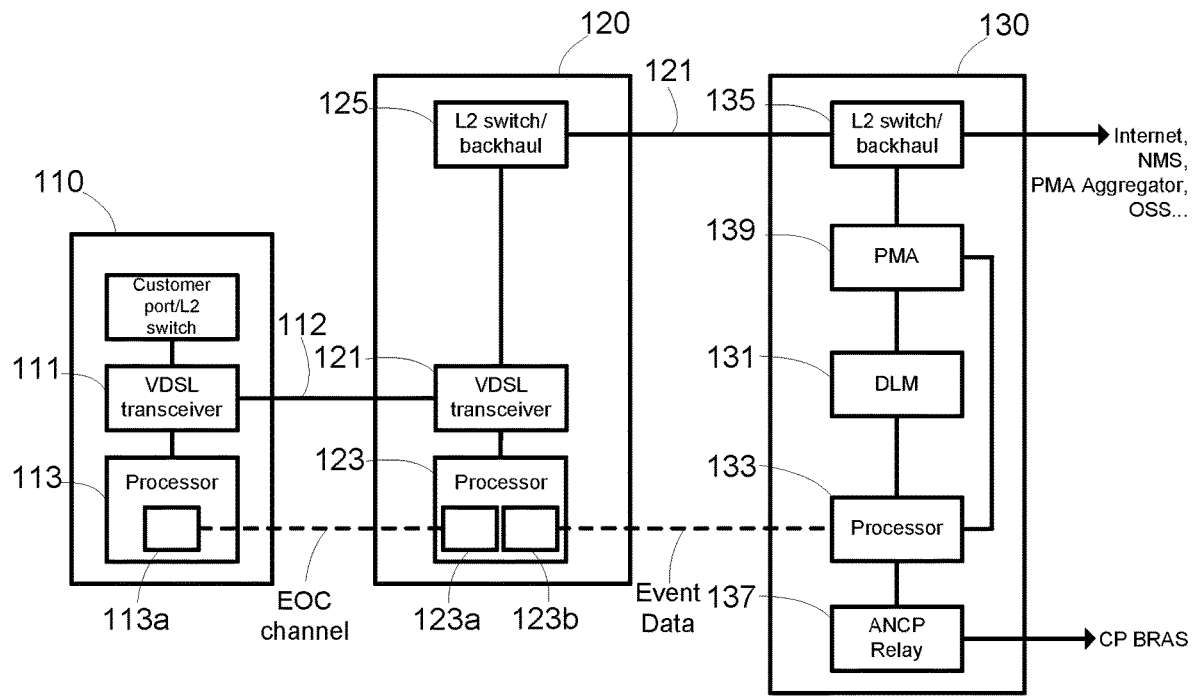
FIG. 5 is a schematic diagram illustrating the CPE, street cabinet and head-end node of FIG. 4.

A schematic diagram of the first CPE 110, street cabinet 120 and head-end node 130 is shown in FIG. 5 (and the skilled person will understand that the second CPE 111 uses a similar architecture). As shown in the diagram, the first CPE 110 and street cabinet 120 include a VDSL transceiver 111, 121 maintaining a VDSL connection over wire 112. In a similar fashion to the first embodiment described above, the CPE 110 also includes a processing module 113 having a performance statistics module 113a. Similarly, the street cabinet 120 includes corresponding elements to the DPU 20 of the first embodiment, and therefore includes a processing module 123 having a performance statistics module 123a and a data gathering module 123b, and a Layer 2 switch/backhaul 125 terminating an optical fiber connection 121 to a corresponding Layer 2 switch/backhaul 135 in the head-end node 130.

The head-end node 130 is similar to that of the first embodiment, and thus also includes a DLM engine 131, processing module 133 and ANCP Relay 137. The head-end node 130 also connects the street cabinet 120 to the Internet 103, NMS 105, OSS 107 and CP BRAS 109. In this example, the head-end node 130 also includes a PMA 139. However, the skilled person will understand that the PMA 139 is not essential in this VDSL deployment as there would be local or forward power. Thus, the DLM engine 131 may instead act directly on the DSLAM (e.g. via the Q interface).

The skilled person will therefore realize that the VDSL deployment of the second embodiment may be controlled in the same manner as the G.fast deployment of the first embodiment. Accordingly, an event occurring on the first or second CPE 110, 120 or the street cabinet may be recorded by the data gathering module 123*b*, together with a factor or factors contributing to the event, which is then forwarded to the PMA 139 of the head-end node 130. The processing module 133 of the head-end node 130 may then poll the data buffers of the PMA 139 (or DSLAM processor 123) every N seconds to determine the recent events occurring on the VDSL connection, and classify these events as 'speed' or 'stability' related. All stability related events may then be forwarded to the DLM engine 131, which may then respond to the event in dependence on the factor or factors contributing to the event (immediately or if the number of events in a given period of time reaches a threshold). Alternatively, all speed related events may be forwarded to the ANCP Relay 137, which forwards an ANCP message to the appropriate CP BRAS 109 in response.

The skilled person will therefore understand that the present disclosure provides an improved Dynamic Line Management system which is distributed in or about the Access Network such that it may react to events occurring on DSL connections in a real time manner. Conventionally, the events were recorded and a bulk file was uploaded periodically to a DLM engine residing in the Core Network, which would then analyze the data and make any necessary changes. However, these bulk data files would only include basic information regarding the event (rather than indicating why a particular event occurred) as the bulk data files would be too large to upload and process at the DLM engine in the Core Network. However, by distributing the DLM engine as in the present disclosure, the DLM engine is able to act on the events in real time, and react according to the cause of the event.

The skilled person will also understand that it is not essential that the data gathering modules of the embodiments above implement the "Data gathering function" of ITU-T Recommendation 993.2 Amendment 3. That is, the data gathering module may implement any suitable function to record data relating to an event and a factor or factors contributing to the event.

The skilled person will also understand that it is not essential for the elements of the head-end node to be placed in a dedicated entity in the Access Network. That is, these elements may instead be collocated with the DSLAMs of the DPUs or street cabinet. However, especially in the case of the DPU which is only reverse powered, it is beneficial to separate these functional elements and place them in a dedicated module which may have a more reliable power supply. Furthermore, the elements may be distributed about one or several entities in the Access Network, and each process step mentioned above may be implemented by one or more processing modules.

The skilled person will also understand that the ANCP Relay is a non-essential part of the present disclosure. However, the head-end node provides a suitable entity to perform the ANCP Relay function, such that all speed related events can be forwarded to it for generating the appropriate ANCP messages.

The above two embodiments relate to a G.fast and VDSL deployment of the present disclosure. However, the skilled person will understand that the present disclosure is applicable to any form of DSL connection by implementing the functions of the head-end node into the Access Network (either in a dedicated node or distributed over several nodes in the Access Network). Accordingly, the present invention is also applicable to ADSL, ADSL2, ADSL2+, VDSL2 and any other current and future version of xDSL technology.

The skilled person will understand that any combination of features is possible within the scope of the claims.

The invention claimed is:

1. A method of controlling an Access Network including a plurality of Digital Subscriber Line (DSL) connections, the method comprising:
    gathering data on the DSL connection, wherein the data is gathered using a data gathering function defined in ITU-T Recommendation G.993.2 and the data indicates:
        an event identifier, identifying an occurrence of a particular event on a DSL connection, and
        a factor contributing to the event; and
    responding to the event by a Dynamic Line Management (DLM) engine residing in the Access Network, wherein the DLM engine response is dependent on the factor contributing to the event.

2. A method as claimed in claim 1, wherein, after receiving data relating to an event on the DSL connection, the method further comprises:
    storing the received data in memory in a proxy management unit; and
    forwarding the data stored in the memory in the proxy management unit to the DLM engine.

3. A method as claimed in claim 2, wherein after storing the received data in the memory, the method further comprises:
    classifying the data stored in the memory, wherein the data stored in the memory is only forwarded to the DLM engine if the data is classified as an event related to stability of the DSL connection.

4. A method as claimed in claim 2, wherein after storing the received data in the memory, the method further comprises:
    classifying the data stored in the memory as either an event related to stability of the DSL connection or an event related to speed of the DSL connection.

5. A method as claimed in claim 1, wherein the DLM engine responds to the event after the event has occurred a predetermined number of times.

6. A method as claimed in claim 1, wherein the DLM engine responds to the event using an On Line Reconfiguration (OLR) process.

7. A method as claimed in claim 2, wherein the DSL connection is a G.fast connection and the DLM engine resides in a dedicated node in the Access Network.

8. A method as claimed in claim 7, wherein the DLM engine and the proxy management unit are located in the dedicated node in the Access Network.

9. A method as claimed in claim 1, wherein the DSL connection is a VDSL connection and the DLM engine resides in a dedicated node in the Access Network.

10. A method as claimed in claim 9, wherein the DSL connection is a VDSL connection and the DLM engine resides in a street cabinet.

11. An Access Network node for use in an Access Network including a plurality of Digital Subscriber Line (DSL) connections, the node comprising:
    gathering data on the DSL connection, wherein the data is gathered using a data gathering function defined in ITU-T Recommendation G.993.2 and the data indicates:
        an event identifier, identifying the occurrence of a particular event on a DSL connection, and
        a factor contributing to the event; and a Dynamic Line Management (DLM) engine adapted to respond to the event, wherein the DLM engine response is dependent on the factor contributing to the event.

12. A node as claimed in claim 11, further comprising a proxy management unit including:
    a receiver adapted to receive the data relating to the event;
    a memory adapted to store the received data; and
    a transmitter adapted to transmit the data relating to the event to the DLM engine.

13. A node as claimed in claim 12, further comprising a processor adapted to classify the data stored in the memory, wherein the data stored in the memory is only forwarded to the DLM engine by the transmitter if the data is classified as an event related to stability of the DSL connection.

14. A node as claimed in claim 12, further comprising a processor adapted to classify the data stored in the memory, wherein the data stored in the memory is classified as either an event related to stability of the DSL connection or an event related to speed of the DSL connection.

15. A node as claimed in claim 11, further comprising a counter adapted to count events on the DSL connection, wherein the DLM engine is adapted to respond to the event when the counter reaches a predetermined threshold.

16. A node as claimed in claim 11, wherein the DLM engine responds to the event using an On Line Reconfiguration (OLR) process.

17. A node as claimed in claim 11, wherein the DSL connection is a G.fast connection, the node resides in a dedicated node in the Access Network and the receiver is adapted to receive data relating to the event on a DSL connection from a Distribution Point Unit (DPU).

18. A node as claimed in claim 11, wherein the DSL connection is a VDSL connection, the node resides in a dedicated node in the Access Network and the receiver is adapted to receive data relating to the event on the DSL connection from a street cabinet.

19. A node as claimed in claim 11, wherein the DSL connection is a VDSL connection and the node resides in a street cabinet.

* * * * *